(12) United States Patent  (10) Patent No.: US 7,850,061 B2
Rigal et al.  (45) Date of Patent: Dec. 14, 2010

(54) METHOD FOR MAKING A COMPONENT INCLUDING FLUID FLOW CHANNELS

(75) Inventors: Emmanuel Rigal, Saint Martin le Vinoux (FR); Guillaume De Dinechin, Issy les Moulineaux (FR); Philippe Bucci, Engins (FR); Philippe Aubert, Paris (FR)

(73) Assignee: Commissariat a l'Energie Atomique (FR)

( * ) Notice: Subject to any disclaimer, the term of this patent is extended or adjusted under 35 U.S.C. 154(b) by 260 days.

(21) Appl. No.: 11/793,550

(22) PCT Filed: Dec. 16, 2005

(86) PCT No.: PCT/FR2005/051094
§ 371 (c)(1),
(2), (4) Date: Jun. 18, 2007

(87) PCT Pub. No.: WO2006/067349
PCT Pub. Date: Jun. 29, 2006

(65) Prior Publication Data
US 2008/0116246 A1 May 22, 2008

(30) Foreign Application Priority Data
Dec. 21, 2004 (FR) .................... 04 53121

(51) Int. Cl.
*B23K 31/02* (2006.01)

(52) U.S. Cl. .................... 228/193; 228/183; 29/890.03

(58) Field of Classification Search ............... 228/193, 228/183; 29/890.03, 890.036–890.037
See application file for complete search history.

(56) References Cited

U.S. PATENT DOCUMENTS

| 1,662,870 | A | * | 3/1928 | Stancliffe | ............... 165/166 |
| 3,394,446 | A | * | 7/1968 | Valyi | ............... 228/118 |
| 5,249,359 | A | * | 10/1993 | Schubert et al. | ....... 29/890.039 |
| 2004/0099712 | A1 | * | 5/2004 | Tonkovich et al. | ......... 228/193 |
| 2004/0194942 | A1 | * | 10/2004 | Okamoto et al. | ........... 165/170 |

FOREIGN PATENT DOCUMENTS

FR  2 850 741  1/2003
GB  2399164 A * 9/2004

OTHER PUBLICATIONS

French Search Report citing above reference.

* cited by examiner

*Primary Examiner*—Jessica L Ward
*Assistant Examiner*—Devang R Patel
(74) *Attorney, Agent, or Firm*—Baker & Hostetler LLP

(57) ABSTRACT

A method for making a component including fluid flow channels formed by making a plurality of grooves (12), in at least one face (21) of a base plate (10); having opposite ends so that the grooves have open top sides; scalably blocking the open top side of each groove and diffusion-welding a lid by hot isostatic compression onto the face (21) of the base plate (10) to cover each of the strips leaving open the fluid flow channels at one or both opposite ends of the base plate for allowing pressurized gas to penetrate into the flow channels.

37 Claims, 5 Drawing Sheets

METHOD FOR MAKING A COMPONENT INCLUDING FLUID FLOW CHANNELS

TECHNICAL FIELD

The invention relates to a method for making a component including fluid flow channels, notably but not exclusively intended for heat exchange between two fluids.

To produce cooling channels in structures, one resorts either to various machining techniques or to assembling elementary parts. The structures which may directly be obtained by machining are very limited both in terms of section for letting through the cooling fluid and in terms of geometries of circuits. Thus, one is generally led to assembling simple elementary parts. Many assembling techniques may be used, notably brazing, fusion welding by means of various sources of energy (electric arc, high energy beams) and diffusion welding. Diffusion welding consists of applying a force on the surfaces to be assembled, at a high temperature and for a given time. Continuity of the material between the parts is established by suppressing plays and porosities under the combined effect of the temperature and force. With this technique, it is possible to obtain particularly complex geometries when it is applied by Hot Isostatic Compression, or HIC (i.e., the force is obtained by gas pressure). With HIC diffusion welding, monolithic structures may be reconstructed from a great variety of components such as metal sheets, plates, shells, either bent tubes or not. Conversely to the other aforementioned techniques, it may be applied for assembling large complex surfaces, without filler metal. Problems associated with the presence of low melting point materials (limitation of the temperature of use, low resistance of the brazed joints) and with the presence of weld passing through the walls (risks of leaks) are thereby avoided. The junctions obtained by diffusion welding are known to be particularly resistant.

A frequently encountered case is that of plates or shells which should have one or more internal cooling circuits. A solution for producing this type of structure is to insert tubes 6 with the desired channel geometry between two grooved plates 2, 4 (FIG. 1) [1]. As the grooves 7 have the geometry of a tube, the final geometry may be reconstructed by stacking the parts. Assembling by diffusion welding is performed in the following way: the surfaces to be assembled are cleaned, the parts are stacked, the periphery of the plates and of the tubes is sealably welded, the interface is degassed, and the stack is submitted to a HIC cycle, the parameters of which (time, temperature, pressure) depend on the nature of the metal material(s). During this HIC cycle, the gas pressure cannot penetrate into the interfaces and the parts are welded. As the tubes are submitted to the same pressure as the outer surfaces, they are not crushed by the latter.

An important limit of the technique described in the previous paragraph occurs in the case of structures including section channels such that the corresponding tubes do not exist commercially or the channels include bends which cannot be made by bending tubes. Tubes cannot be used in this case. Assembling by HIC diffusion welding of the grooved plates without any inserted tubes is only possible at the cost of significant degradation of the structure. Indeed, if the inlets and outlets of the channels are not sealed, the pressurization gas penetrates between the plates and there is no welding. Conversely, if the inlets and outlets of the channels are sealed, the latter are crushed by the pressure and the result of this is an unacceptable loss of dimensional accuracy or even disappearance of the channels. Reducing the pressure reduces the crushing but this is done at the cost of reduction in the resistance of the plate/plate junction. Another solution would be to fill the grooves with cores made in a material capable of being removed after assembly by chemical dissolution or by another means. In this way, crushing of the channels is prevented. In practice, removal of the filling material is very difficult.

A method for making an active cooling panel is furthermore known (FR 2 850 741). According to this method, a first part in a thermostructural composite material is made with an inner face having recessed reliefs forming channels; a metal coating is formed on this face; a second part in a thermostructural composite material is made with an inner face intended to be applied onto the inner face of the first part; a metal coating is formed on the inner face of the second part; both parts are assembled by hot pressing so as to obtain a cooling panel with integrated flow channels.

In this method, the composite material parts are inserted into a sealed casing. The pressurization gas cannot penetrate into the channels. This solution is possible because the composite materials at the welding temperature retain sufficiently high stiffness in order to avoid crushing of the channels. Application of this solution to metal materials, without any intermediate metal coating, is not possible because at the welding temperature, the latter would deform.

Now, the presence in the component of a second material is frequently undesirable because it complicates its dimensioning, for example its pressure strength. It requires considerable developments for qualifying the component with regard to its use.

On the other hand, one of the advantages of diffusion welding is lost, i.e., the mechanical performances of the junctions may be very close to those of the base material if the required precautions are taken (adequate surface preparation and welding parameters).

The object of the present invention is a method for making a component including fluid flow channels, notably a heat exchanger component, which finds a remedy to these drawbacks. With this method, it should be possible to obtain structures cooled by internal channels non-comparable with bent tubes.

These objects are achieved, according to the invention, by the fact that grooves are made in at least one face of a base plate; the tops of the grooves are sealably blocked, preferably by welding, by means of strips; a lid is diffusion-welded under hot isostatic compression on the face of the base plate including the grooves, above the strips.

Preferably, the strips are welded on the base plate, notably by laser welding.

By welding, the use of brazing is suppressed. The maximum temperature at which the component may be used is therefore increased. With laser welding, accessibility to parts of small dimensions may further be achieved.

The welds do not cross the whole of the walls since these welds are exclusively used for binding the strips onto the base plate.

Diffusion welding does not require the use of tubes and does not produce any deformation of the channels, even if they have a small section. Further, the cross-section of these channels may vary depending on their lengths, which is not the case in a method of the prior art in which tubes are used. Finally, possible defects (lack of penetration for example) of the weld beads of the strips on the base plate are without any consequence, as the base plate is covered with a lid which forms a second wall for better mechanical strength.

Advantageously, fittings are made in the grooves before blocking them by means of strips. The span of these fittings is preferably between 0.1 mm and 0.6 mm, and their depth is between 0.5 mm and 1 mm. Preferably, the play between the faces of the fitting and the strips introduced into these fittings does not exceed 0.1 mm.

In a particular embodiment, after the step for diffusion-welding the lid onto the base plate, the base plate and/or the lid are machined in order to reduce the thickness of the component.

This embodiment is particularly suitable for the case when making small thickness components is desired.

In a particular embodiment, grooves may also be formed in each of the two faces of the base plate. A component is thereby made, including a base plate sandwiched between two lids. This embodiment provides a compact structure. In another particular embodiment, grooves are further made in the lid so that it itself forms a base plate.

This lid may be closed by a lid without any grooves or possibly by a new lid itself including grooves.

Other features and advantages of the invention will become further apparent upon reading the description which follows of exemplary embodiments given as an illustration with reference to the appended figures.

In these figures:

FIG. 1, already described, is a perspective view of a plate made according to the prior art;

Figure 1:
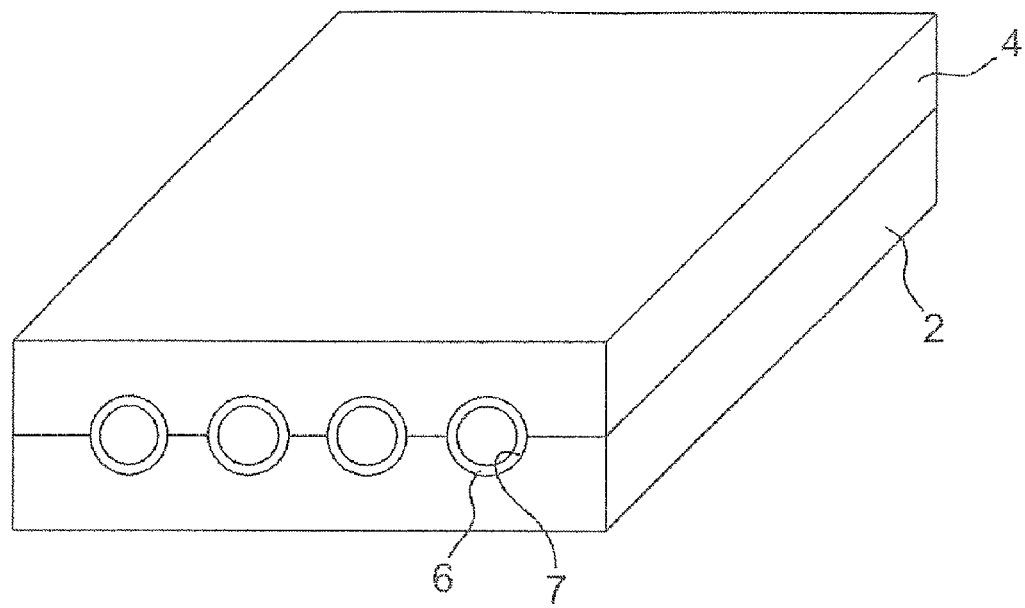
Figure 2:
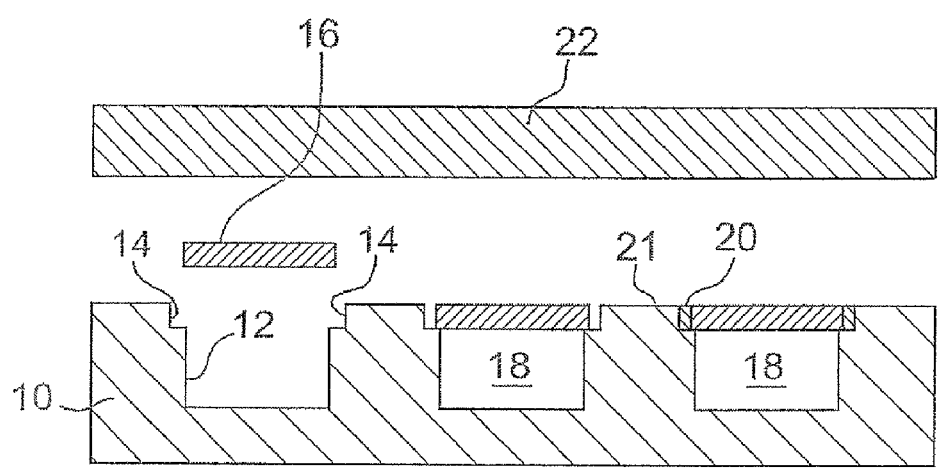
FIG. 2 is a schematic sectional view illustrating the different steps of the method of the invention.

According to FIG. 2, in a first phase, grooves 12 are machined in the base plate 10. Each groove 12 opens out at least at one of its ends. The grooves cover the base plate along directions imposed by the drawing of the cooled structure. They may be of very diverse section and course. They may notably have a rectangular, polygonal, semicircular section. They may also have a section which varies according to their length. Their course may either be straight or not. It may also have turnarounds and/or tight corners which would not be able to be made by using bent tubes according to the prior art as illustrated in FIG. 1.

Different machining methods may be retained depending on the geometry of the grooves. For example milling may be used with saw milling tools, ball milling tools, high speed machining, chemical machining, electrochemical machining or die sinking.

Preferably, the grooves have two fittings 14 intended to receive a strip 16 which blocks the grooves. In an exemplary embodiment, the span of the fittings is between 0.1 mm and 0.6 mm and their depth is between 0.5 mm and 1 mm. The width of the fitting is adjusted so that the play of the strip 16 is at most 0.1 mm. The thickness of the strips 16 is substantially equal to the depth of the fitting, i.e., from 0.5 to 1 mm.

The strips 16 may be obtained by mechanical cutting, laser cutting or by any other suitable means from sheets or another form of semi-finished products.

After having positioned the strips 16 in the fittings 14, they are welded on the base plate 10 for example by YAG or $CO_2$ laser welding so as to form closed channels 18. Usually, two weld beads 20 are required for each strip 16. In other words, a weld bead is necessary for each of the fittings 14. However, in the case of a structure in which the cooling channels 18 are very close to each other, a single weld bead may be sufficient in order to obtain the seal of the fitting located on the right of a strip and of the fitting located on the left of the adjacent strip, simultaneously.

The welding conditions may be defined in order to obtain welds opening into the grooves. Advantageously, non-destructive testing of the X-ray radiography type is performed in order to check for the absence of any redhibitory defect in the weld beads and, if necessary, check that the weld is well penetrated. The seal of each channel of the plate 10 may also be checked by a helium leak test. The surfaces to be assembled by diffusion-welding are then cleaned and pretreated (for example by chemical etching or slight machining) in order to obtain a clean surface.

One then proceeds with HIC (Hot Isostatic Compression) diffusion-welding of the lids 22 on the face 21 of the base plate 2 in which the grooves 12 were made.

The upper face of the base and the upper face of the strips form a first surface on which the lid is laid. The face of the lid facing this first surface forms a second surface. Both of these surfaces form the interface to be diffusion-welded. The periphery of the interface is sealably welded and degassed.

Sealing the grooves 12 by means of strips 16 welded by a laser method, enables HIC diffusion-welding without any significant deformation of the channels 18, the latter being open at, at least one of their ends. With HIC diffusion-welding, the wall thickness may be increased up to a desired value simply by acting on the thickness of the lid 22. Not only it would not be possible to directly obtain this thickness by laser welding, but further with the presence of the lid, the weld beads 20 may be isolated from the outside medium and the risk of a leak may thereby be reduced during service operation.

For steels and nickel alloys, the welding temperature is typically selected between 1,000° C. and 1,250° C. and the pressure typically between 800 bars and 1,500 bars. The welding time typically is at least two hours and at most 10 hours.

Figure 3:
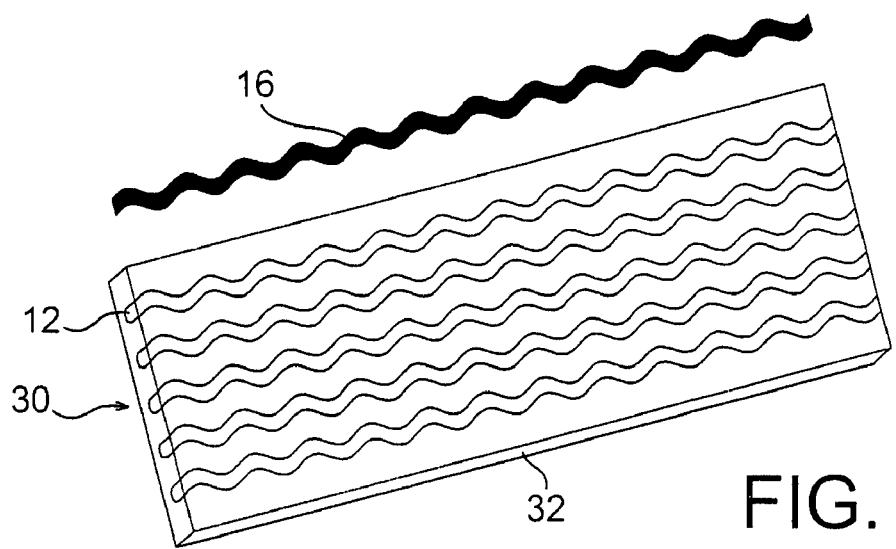
FIG. 3 is a perspective view of a heat exchanger plate made according to the invention.
Figure 4:
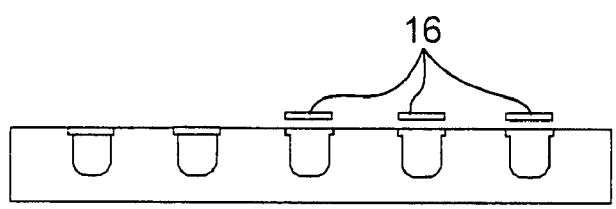
FIG. 4 is a sectional view of the plate of FIG. 3 during its making.
Figure 5:
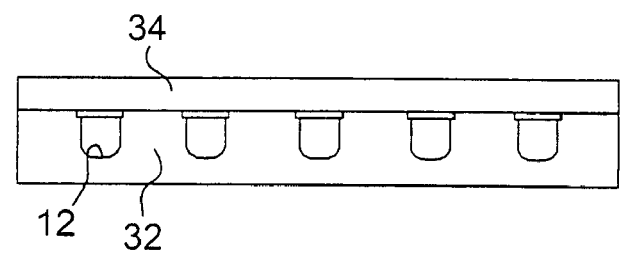
FIG. 5 is a sectional view of this finished plate.
Figure 6:
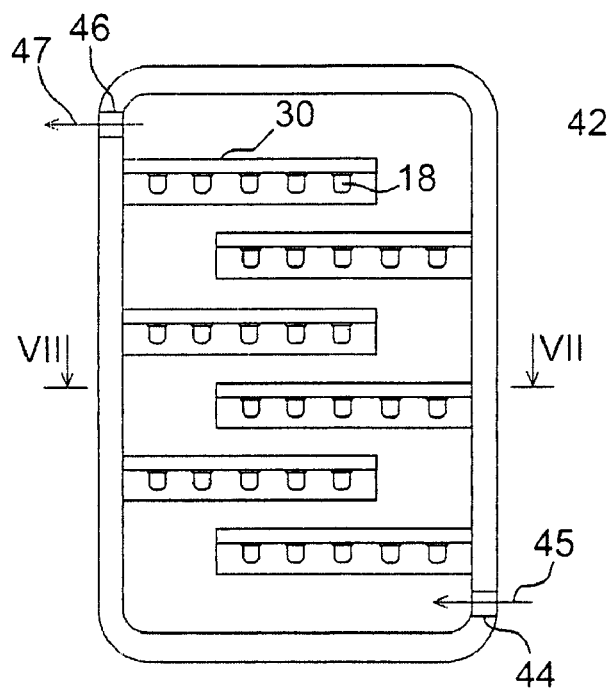
FIGS. 6 and 7 are two sectional views of a heat exchanger using plates of the invention, for example the plates of FIGS. 3-5.
Figure 7:
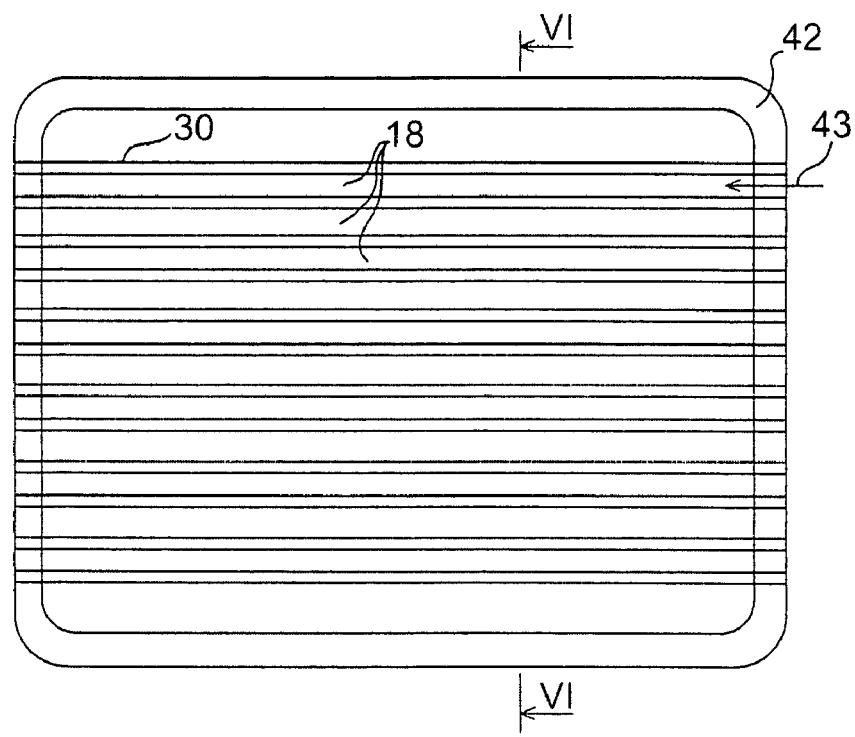

An exemplary embodiment of a heat exchange plate 30 according to the method of the invention is illustrated in FIGS. 3-5. Grooves 12 having a corrugated shape 5 are formed along the length of the base plate 32 which has the shape of a right-angled parallelepiped of small thickness. As explained earlier, strips are made, the shape of which is adapted to that of the grooves 12. In this case, in the example, the strips 16 have a corrugated shape. FIG. 4 shows the insertion of the strips into the fittings of grooves 12. FIG. 5 is a cross-sectional view of the plate 30 after HIC diffusion-welding of the lid 34. The plate 30 of FIG. 3 may be used in a large number of heat exchanger types. FIGS. 6 and 7 illustrate an example. FIG. 7 is a sectional view along the plane VII-VII of FIG. 6. The heat exchanger illustrated as a section in FIG. 6 includes a calandria 42 for example made in folded and welded steel sheet. Heat exchanger plates 30 are positioned horizontally inside the calandria 42. A first heat transfer fluid flows inside the channels 18 of each of these plates (arrows 43, FIG. 7). A second heat transfer fluid flows in the calandria with a heat exchange relationship with the first fluid. The second fluid penetrates through an inlet aperture 44 located at the right lower portion of the calandria (according to FIG. 6) as shown by the arrow 45 and after having taken a sinuous course in which it flows in contact with the surfaces of the plates 30, it flows out of the exchanger through the outlet port 46, as schematized by the arrow 47.

Figure 8:
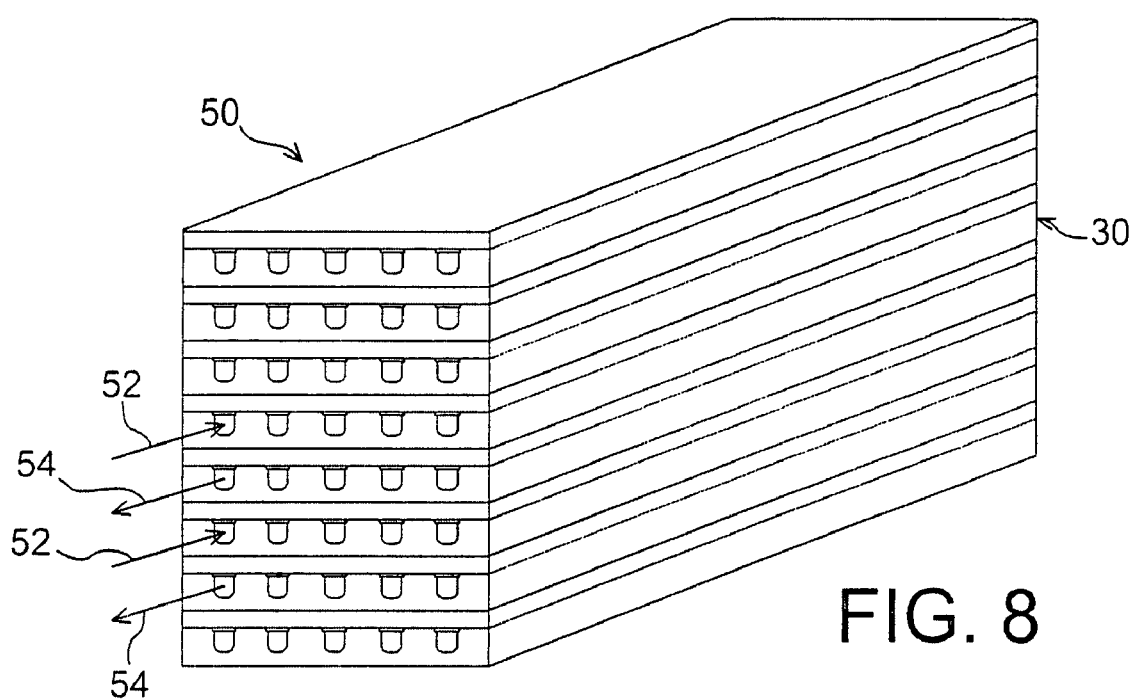
FIG. 8 is a perspective view of a compact heat exchanger including plates made according to the invention.

Another embodiment of a heat exchanger obtained with plates such as the plates 30 illustrated in FIG. 3, is illustrated in FIG. 8. This exchanger simply consists of superimposed plates 30, eight in the example. A first fluid flows in four of these plates, as schematized by the arrow 52 and a second fluid flows in four other ones of these plates as schematized by the arrows 54. The plates in which the first fluid flows alternate with the plates in which the second fluid flows. The flow of these fluids is a counter current flow. A compact heat exchanger is thereby achieved. The fluid feeds and the outlets are made in a known way.

Figure 9:
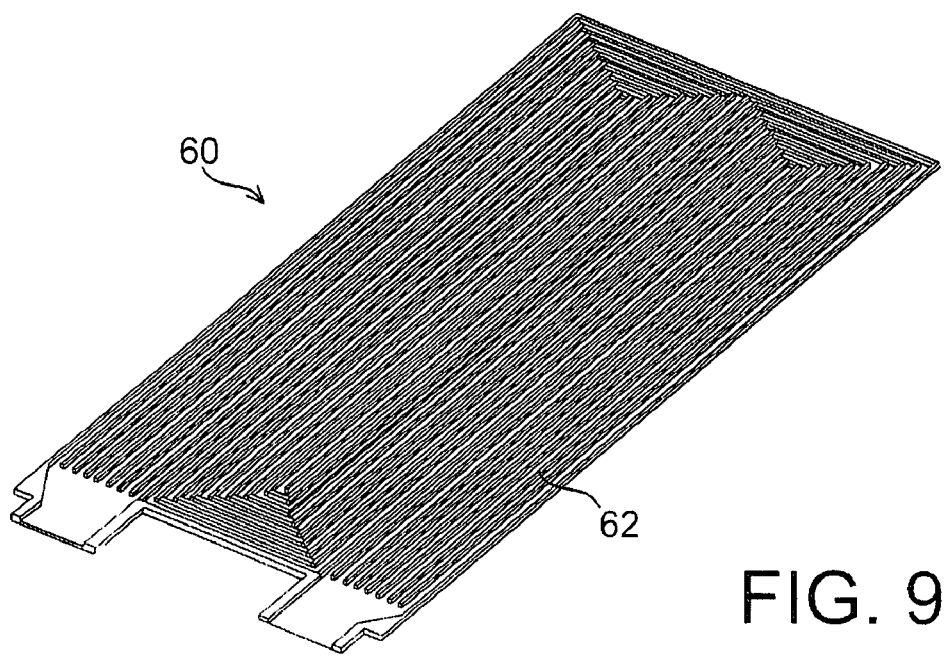
FIG. 9 is a perspective view of a cooling plate of a covering module for a thermonuclear fusion reactor.
Figure 10:
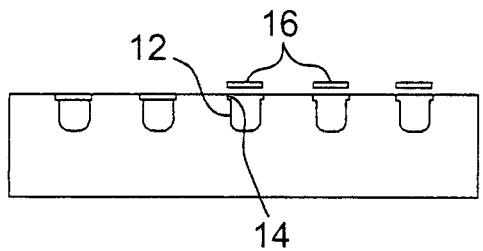
FIGS. 10, 11, 12 illustrate three steps for making the covering module for a thermonuclear fusion reactor of FIG. 9.
Figure 11:
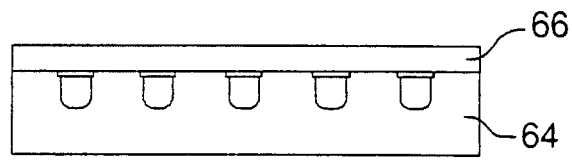
Figure 12:
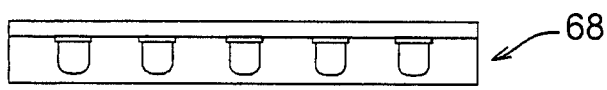

A perspective view of a thermonuclear fusion reactor component with a small thickness (6.5 mm) in which cooling circuits are made, with a square section, of 4 mm×4.5 mm in the example, is illustrated in FIG. 9. These cooling circuits are complex and they cannot be made by simple machining according to the method described with reference to FIG. 1. Further, a perfect seal of the cooling circuit is required for these components, a seal which cannot be guaranteed by simple hot isostatic compression diffusion-welding as this is explained in the introduction. Thus, according to a particular alternative of the invention, grooves having desired sections, a square section of 4 mm×4.5 mm in the example, with fittings with a span between 0.2 mm and 0.6 mm and a depth between 0.5 mm and 1 mm are machined in relatively thick plates, with a thickness of 15 mm for example. Next, strips 16 having a thickness and a shape adapted to the geometry of the cooling circuits, are welded with a laser welding method (FIG. 10). A lid 66 is then added by hot isostatic compression (FIG. 11). The thereby obtained component is then machined in order to provide it with the specified thickness, i.e., 6.5 mm in the example (FIG. 12). As this may be seen by comparing FIGS. 11 and 12, the reduction in thickness is obtained both by machining the lid 66 and the base plate 64.

Figure 13:
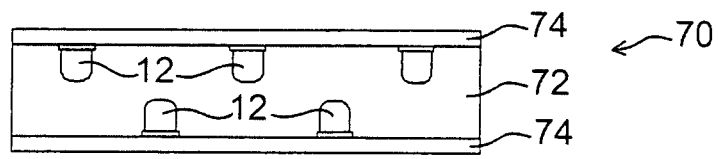
FIGS. 13 and 14 illustrate two alternative embodiments of a component including fluid flow channels according to the invention.

In a particular embodiment (FIG. 13) a component 70 including fluid flow channels according to the invention may be made by machining grooves in each of the faces of a base plate 72. A lid 74 is then associated with each of these faces as described earlier.

Figure 14:
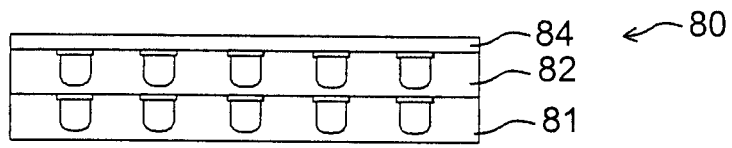

In another particular embodiment (FIG. 14), a component 80 according to the invention, may be made by using a lid 82 assembled by HIC diffusion-welding on a base plate 81, the lid 82 itself including grooves 12. In this way, the lid 82 itself forms a base plate with regard to a lid 84. A compact component is thereby achieved.

In the described examples, the plates are planar. However, it is understood that the plates may also have a radius of curvature (a cylinder portion, a corrugated sheet shape, etc.). It is only required that the plate and the lid have the same radii of curvature so that they may fit into each other without any play.

REFERENCES

[1] Fusion reactor first wall fabrication techniques; G. Le Marois, E. Rigal, P. Bucci, Fusion Engineering and Design 61-62 (2002) 103-110—Elsevier Science B.V.

The invention claimed is:

1. A method for making a component including fluid flow channels (18) formed by making a plurality of hollow grooves (12) in at least one face (21) of a base plate (10) so that the grooves have open top sides and with the base plate having opposite ends wherein the method is characterized by:
    sealably blocking the open top side of each of the grooves (12) by welding a plurality of strips (16) corresponding in number to the number of grooves, for forming said fluid flow channels (18) with open ends at least at one of the opposite ends of the base plate;
    placing a lid (22) onto the face (21) of the base plate (10) such that the lid (22) covers each and every strip (16); and
    diffusion welding said lid (22) onto the face (21) of the base plate (10) using hot isostatic compression so that a pressurized gas can flow from said open ends at least at one of the opposite ends of the base plate through said fluid flow channels (18).

2. The method according to claim 1, wherein the strips (16) have opposite edges and that each opposite edge of each strip is welded to the top of a corresponding groove to sealably block the groove.

3. The method according to claim 2, wherein the strips (16) are welded to the one face (21) of the base plate (10) by laser welding.

4. The method according to claim 1, wherein fittings (14) are made in the grooves (12) before their blocking by means of the strips (16).

5. The method according to claim 4, characterized in that the span of the fittings (14) is between 0.1 mm and 0.6 mm.

6. The method according to claim 4, wherein the depth of the fittings (14) is between 0.5 mm and 1 mm.

7. The method according to claim 3, wherein the play between the fitting (14) and the strip (16) inserted into this fitting (14) is less than 0.1 mm.

8. The method according to claim 1, characterized in that, after the step for diffusion-welding the lid (22) with hot isostatic compression, the base plate (10) and/or the lid (22) are machined in order to reduce the thickness of the component.

9. The method according to claim 1, characterized in that grooves (12) are made in each of two faces of a base plate (72).

10. The method according to claim 1, characterized in that grooves (16) are made in the lid (82) so that it itself forms a base plate.

11. The method according to claim 2, wherein fittings (14) are made in the grooves (12) before their blocking by means of the strips (16).

12. The method according to claim 3, wherein fittings (14) are made in the grooves (12) before their blocking by means of the strips (16).

13. The method according to claim 5, wherein the depth of the fittings (14) is between 0.5 mm and 1 mm.

14. The method according to claim 4, wherein the play between the fitting (14) and the strip (16) inserted into this fitting (14) is less than 0.1 mm.

15. The method according to claim 5, wherein the play between the fitting (14) and the strip (16) inserted into this fitting (14) is less than 0.1 mm.

16. The method according to claim 6, wherein the play between the fitting (14) and the strip (16) inserted into this fitting (14) is less than 0.1 mm.

17. The method according to claim 2, characterized in that, after the step for diffusion-welding the lid (22) with hot isostatic compression, the base plate (10) and/or the lid (22) are machined in order to reduce the thickness of the component.

18. The method according to claim 3, characterized in that, after the step for diffusion-welding the lid (22) with hot isostatic compression, the base plate (10) and/or the lid (22) are machined in order to reduce the thickness of the component.

19. The method according to claim 4, characterized in that, after the step for diffusion-welding the lid (22) with hot isostatic compression, the base plate (10) and/or the lid (22) are machined in order to reduce the thickness of the component.

20. The method according to claim 5, characterized in that, after the step for diffusion-welding the lid (22) with hot isostatic compression, the base plate (10) and/or the lid (22) are machined in order to reduce the thickness of the component.

21. The method according to claim 6, characterized in that, after the step for diffusion-welding the lid (22) with hot isostatic compression, the base plate (10) and/or the lid (22) are machined in order to reduce the thickness of the component.

22. The method according to claim 7, characterized in that, after the step for diffusion-welding the lid (22) with hot isostatic compression, the base plate (10) and/or the lid (22) are machined in order to reduce the thickness of the component.

23. The method according to claim 2, characterized in that grooves (12) are made in each of the two faces of a base plate (72).

24. The method according to claim 3, characterized in that grooves (12) are made in each of the two faces of a base plate (72).

25. The method according to claim 4, characterized in that grooves (12) are made in each of the two faces of a base plate (72).

26. The method according to claim 5, characterized in that grooves (12) are made in each of the two faces of a base plate (72).

27. The method according to claim 6, characterized in that grooves (12) are made in each of the two faces of a base plate (72).

28. The method according to claim 7, characterized in that grooves (12) are made in each of the two faces of a base plate (72).

29. The method according to claim 8, characterized in that grooves (12) are made in each of the two faces of a base plate (72).

30. The method according to claim 2, characterized in that grooves (16) are made in the lid (82) so that it itself forms a base plate.

31. The method according to claim 3, characterized in that grooves (16) are made in the lid (82) so that it itself forms a base plate.

32. The method according to claim 4, characterized in that grooves (16) are made in the lid (82) so that it itself forms a base plate.

33. The method according to claim 5, characterized in that grooves (16) are made in the lid (82) so that it itself forms a base plate.

34. The method according to claim 6, characterized in that grooves (16) are made in the lid (82) so that it itself forms a base plate.

35. The method according to claim 7, characterized in that grooves (16) are made in the lid (82) so that it itself forms a base plate.

36. The method according to claim 8, characterized in that grooves (16) are made in the lid (82) so that it itself forms a base plate.

37. The method according to claim 9, characterized in that grooves (16) are made in the lid (82) so that it itself forms a base plate.

* * * * *